United States Patent [19]

Balachandran

[11] 4,320,734

[45] Mar. 23, 1982

[54] FUEL SUPPLY SYSTEM FOR DIESEL ENGINE

[75] Inventor: Chandrasegaram Balachandran, London, England

[73] Assignee: Lucas Industries Limited, Birmingham, England

[21] Appl. No.: 141,895

[22] Filed: Apr. 21, 1980

[30] Foreign Application Priority Data

Jun. 1, 1979 [GB] United Kingdom ............... 19199/79

[51] Int. Cl.³ .................... H05B 1/02; F02M 59/00
[52] U.S. Cl. ................... 123/510; 123/514; 123/516; 123/445; 123/557
[58] Field of Search ............ 123/510, 514, 516, 445, 123/446, 557; 210/416.4

[56] References Cited

U.S. PATENT DOCUMENTS

| | | | |
|---|---|---|---|
| 1,601,503 | 9/1926 | Mynro | 210/416.4 |
| 2,535,752 | 12/1950 | O'Connell | 210/416.4 |
| 3,082,875 | 3/1963 | Korte | 210/416.4 |
| 3,239,064 | 3/1966 | White | 210/416.4 |
| 3,548,796 | 12/1970 | Gastinne | 123/510 |
| 4,091,265 | 5/1978 | Richards et al. | 123/557 |

*Primary Examiner*—Raymond A. Nelli

[57] ABSTRACT

A fuel supply system for a diesel engine includes a fuel pump drawing fuel through a filter unit. The pump has an outlet for surplus fuel and also leakage fuel and this fuel is heated during operation of the pump. Most of this fuel is passed along a passage in a through bolt which holds the filter unit in assembly. Heat exchange occurs with the fuel entering the filter unit and this minimizes the risk of freezing of fractions of the fuel.

6 Claims, 3 Drawing Figures

FUEL SUPPLY SYSTEM FOR DIESEL ENGINE

This invention relates to a fuel supply system for a diesel engine, and of the kind comprising a fuel pumping apparatus which includes a high pressure pump for supplying fuel to an injection nozzle of the engine, and a low pressure feed pump which draws fuel through a fuel inlet of the apparatus, and supplies the fuel to the high pressure pump, the apparatus also having a fuel outlet for the escape of fuel collecting within the housing of the apparatus, the system further including filter connected to said inlet and through which fuel passes to said inlet from a fuel tank.

It is well known that the fuel filter must be capable of filtering the fuel passing through it to a very high degree, in order to protect the working surfaces of the apparatus. The efficiency of the filter poses a problem in cold weather conditions when certain fractions of the fuel can freeze. The frozen fractions of the fuel collect on the filter medium, and thereby impede or even prevent the flow of fuel to the apparatus.

It is also known that the fuel leaving the fuel outlet is warmer than the fuel flowing through the inlet, because of the proximity of the apparatus to the engine, and also because of the fact that the fuel has work carried out upon it by the pumps in the apparatus.

The object of the present invention is to provide in a system of the kind specified, a filter in which the risk of clogging of the filter element by the frozen fractions of fuel is minimised.

According to the invention, in a fuel system of the kind specified, the filter comprises first and second housing parts, the first of said housing parts defining a fuel inlet and a fuel outlet, the fuel outlet in use being connected to the inlet of the apparatus and the fuel inlet being connected to the supply tank, a filter element located between said housing parts, a through bolt acting to secure said housing parts in assembled relationship, a passage formed in said through bolt, and connection means communicating with said passage whereby at least a portion of the fuel flowing through the fuel outlet of the apparatus can be caused to flow through said passage, so that the fuel within the filter will be heated.

Examples of fuel systems in accordance with the invention will now be described with reference to the accompanying drawings in which.

Figure 1:
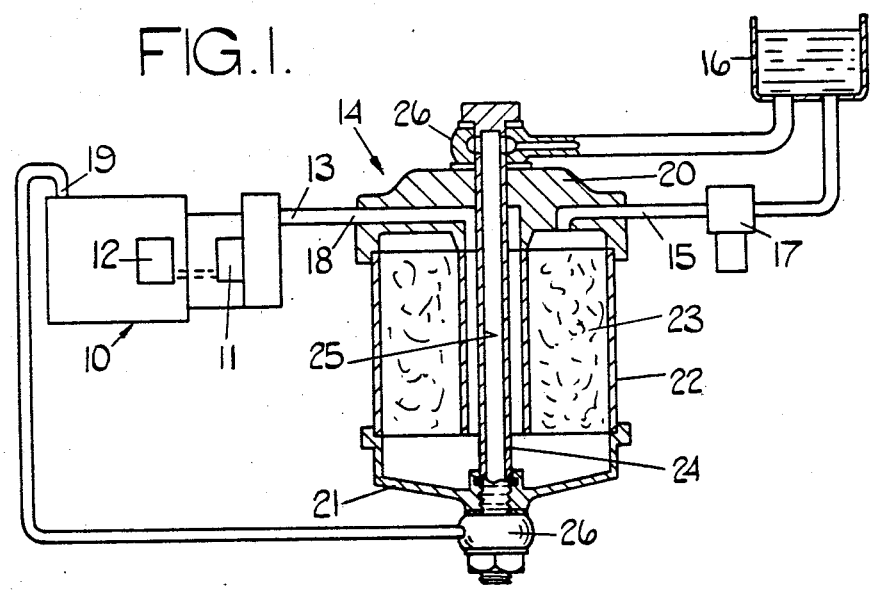
FIG. 1 is a diagrammatic arrangement of an apparatus in accordance with the invention.

Referring to FIG. 1 of the drawings, the fuel system comprises a fuel injection pumping apparatus generally indicated at 10. The apparatus includes an injection pump indicated at 12 and which in use, delivers fuel at high pressure to the injection nozzles of an associated engine. The apparatus includes a drive shaft not shown, which is driven by the engine. Also provided is a feed pump 11, which draws fuel through a fuel inlet 13, and supplies the fuel to the injection pump 12. Means not shown is provided to control the amount of fuel supplied at each injection stroke, by the injection pump 12.

Fuel flows to the fuel inlet 13 by way of a filter illustrated at 14. The filter has a fuel inlet 15, which is connected to a supply tank 16 by way of an optional priming pump 17. Moreover, the filter has a fuel outlet 18, which is connected to the fuel inlet 13.

The pumping apparatus 10, is also provided with a fuel outlet 19. This outlet communicates with a chamber defined in the housing of the apparatus, and in which collects fuel leaking from the high pressure pump, and also fuel which may be deliberately bled from the outlet of the low pressure pump 11 for the purpose of removing any air in the fuel before it can enter the injection pump 12. The outlet 19 is connected to the fuel tank. The fuel leaving the outlet 19 has a higher temperature than the fuel flowing through the inlet 13 because work is carried out on the fuel during its passage through the pumping apparatus. There is also friction loss within the apparatus which raises the temperature of the fuel and also the fuel temperature will be raised by virtue of the fact that the apparatus is mounted in close proximity to the engine.

The filter 14 comprises a pair of housing parts 20, 21. The housing part 20 is provided with the fuel inlet 15 and the fuel outlet 18, and between the housing parts is located the filter element 22, which in practice comprises a metal can within which is located a paper filter medium 23. The filter element together with the housing parts are held in assembled relationship by means of a through bolt 24, the various seals necessary in the construction having been omitted.

As explained in cold weather conditions the lower fractions of fuel can freeze, and the frozen fractions collect on the filter medium and tend to clog the medium so that the supply of fuel to the engine is impaired. Since the fuel flowing through the outlet 19 is heated, it is proposed to use the heat contained in this fuel to warm the fuel within the filter. This is achieved by forming a passage 25 in the through bolt and conveying the fuel flowing between the outlet 19 and the tank through the passage. The through bolt for this purpose has a pair of connectors 26, disposed beneath the head of the bolt and the retaining nut respectively. The connectors may be of the Banjo type. In the manner described the through bolt becomes heated and some of this heat is imparted to the fuel flowing through the fuel inlet 15, so that if the lower fractions of fuel entering through the fuel inlet have become frozen, they will be unfrozen before they pass through the filter medium.

Figure 2:
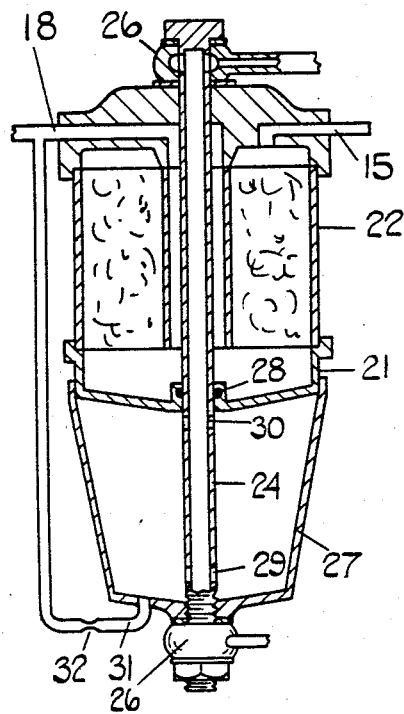
FIG. 2 shows an alternative form of the apparatus seen in FIG. 1.

Referring now to FIG. 2. In this figure the same reference numerals as used in FIG. 1 are retained. As in the previous example the fuel returning from the outlet 19 of the pump enters through the lower connector 26 and passes through the passage 25 to the upper connector 26. The fuel from the upper connector is returned to the tank. In addition however, a cup shaped reservoir 27 is provided and this is retained in sealing engagement by means of the through bolt 24, against the lower housing part 21 of the filter. A seal 28 is provided about the through bolt, to prevent direct communication between the reservoir and the filter.

The reservoir 27 receives fuel from the passage 25 by way of a cross drilling 29, which is formed adjacent to the lower wall of the reservoir. Moreover, air can escape from the upper portion of the reservoir by way of a further cross drilling 30, conveniently of smaller diameter than the drilling 29. Finally the lower portion of the reservoir is connected by way of a conduit 31, with the fuel outlet 18, and incorporated in the conduit is a restrictor 32. The reservoir is provided to assist the priming of the pumping apparatus 10, in the event that the fuel in the tank 16 has become exhausted. It is of particular use when the priming pump 17 is not provided. In use, when the fuel in the tank 16 is exhausted, air will be drawn through the inlet 15, and the level of the fuel in the filter will gradually fall. At some point air will start to flow through the fuel outlet 18, and the engine will be starved of fuel and will only operate at a much reduced power. This is a signal to the operator of the engine to stop the engine and replenish the tank with fuel. Once fuel has been put in the tank the engine can be started to assist the priming process because fuel can be drawn from the reservoir 27, through the conduit 31. The size of the orifice 32 however, is such that the engine will only operate at a low speed. The air contained in the filter will be drawn through the outlet of the filter, and will pass through the feed pump 11 into the chamber in the housing of the apparatus and out through the outlet 19. The air will then flow through the passage 25 in the through bolt and be returned to the tank. Any air which happens to enter the reservoir through the cross drilling 29 will immediately rise to the surface of the fuel in the reservoir which will become full of fuel as the priming process continues.

The size of the orifice 32 is important, because if it imposes too small a restriction on the flow of fuel, the operator could continue to run the engine at only a slightly reduced speed, hence the orifice is made deliberately small so that the engine during the priming process, can only operate at about idling speed. Once fuel has been drawn through the inlet 15 more and more fuel will flow through the outlet 18, and will flow to the engine in the usual manner.

Figure 3:
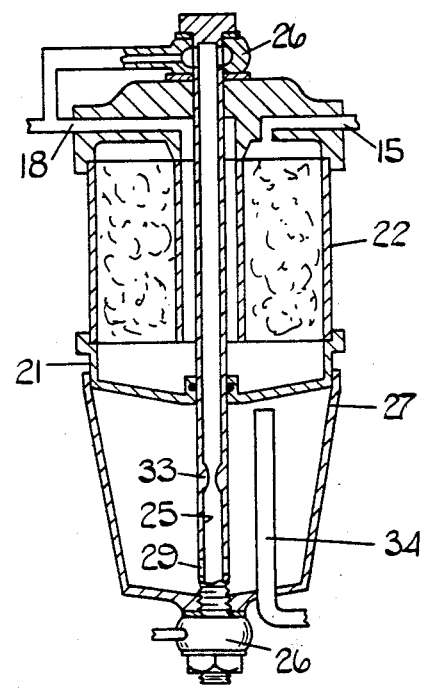
FIG. 3 is a view similar to FIG. 2 showing a modification.

In the arrangement which is shown in FIG. 3, the upper connector 26 is not connected to the fuel tank 16, but to the outlet 18. The lower connector 26 as before is connected to the outlet 19, but the conduit 31 together with the restrictor 32 are omitted. Instead the passage 25 is provided with a restrictor 33, at a position above the cross drilling 29. The other cross drilling 30 is omitted. The fuel is returned to the tank by way of a return pipe 34 which extends upwardly in the reservoir 27. In this example a flow of fuel does take place through the passage 25, when the system is operating normally. Such flow of fuel however, will be less than in the examples of FIGS. 1 and 2. Nevertheless, the flow of fuel is sufficient to minimise the risk of the filter medium becoming clogged. In the event that the tank becomes empty then when air starts to flow through the outlet 18 the engine will be starved of fuel and its speed will automatically decrease. Once the operator has replenished the fuel tank then the fuel which is contained in the reservoir 27 can be used to permit the engine to operate at a low speed whilst the priming process takes place. As the air is purged the fuel level in the reservoir will return to the upper level of the return pipe 34.

I claim:

1. A fuel supply system for a diesel engine comprising a fuel pumping apparatus including a high pressure pump for supplying fuel to an injection nozzle of the engine, and a low pressure feed pump which draws fuel through a fuel inlet of the apparatus, and supplies the fuel to the high pressure pump, the apparatus also having a fuel outlet for the escape of fuel collecting within the housing of the apparatus, the system further including a filter connected to said inlet and through which fuel passes to said inlet from a fuel tank, the filter comprising first and second housing parts, the first of said housing parts defining a fuel inlet and a fuel outlet, the fuel outlet in use being connected to the inlet of the apparatus and the fuel inlet being connected to the supply tank, a filter element located between said housing parts, a through bolt acting to secure said housing parts in assembled relationship, a passage formed in said through bolt, and connection means communicating with said passage whereby at least a portion of the fuel flowing through the fuel outlet of the apparatus can be caused to flow through said passage, so that the fuel within the filter will be heated.

2. A fuel supply system according to claim 1 in which said filter is mounted between said housing parts.

3. A fuel supply system according to claim 2 in which the second housing part in part defines a reservoir for fuel which has passed through said filter, and restricted passage means connecting said reservoir with the fuel inlet of the apparatus.

4. A fuel supply system according to claim 3 including a third housing part which is retained relative to the second housing part by said through bolt, said third housing part defining the remaining portion of the reservoir, an aperture formed in the through bolt adjacent the base wall thereof, restricted passage means connecting said reservoir with the fuel inlet of the pump, and means for allowing excess fuel and air to escape from said reservoir.

5. A fuel supply system according to claim 4 including a further aperture in said through bolt and through which air can escape from said reservoir, said further aperture being positioned adjacent the upper wall of the reservoir, and said restricted passage means comprises a conduit extending from the base wall of the reservoir to the pump inlet said conduit means incorporating a restrictor.

6. A fuel supply system according to claim 4 in which said restricted passage means comprises the passage in said through bolt and a restrictor in said passage, the system further including an overflow outlet from said reservoir.

* * * * *